United States Patent [19]

Denvenyi

[11] Patent Number: 5,406,417
[45] Date of Patent: Apr. 11, 1995

[54] DIFFERENTIAL PNEUMATIC PRESSURE ZOOM LENS DRIVE

[75] Inventor: Gabor Denvenyi, West Penetang, Canada

[73] Assignee: Hughes Aircraft Company, Los Angeles, Calif.

[21] Appl. No.: 73,823

[22] Filed: Jun. 8, 1993

[51] Int. Cl.6 ............................................. G02B 7/02
[52] U.S. Cl. ............................ 359/823; 359/822; 359/826; 359/676; 359/69.1
[58] Field of Search ............... 359/817, 819, 820, 822, 359/823, 825, 826, 676, 793, 691, 693, 694, 696, 846, 847

[56] References Cited

U.S. PATENT DOCUMENTS

| | | | |
|---|---|---|---|
| 3,612,664 | 10/1971 | Berman | 359/820 |
| 4,286,839 | 9/1981 | Ilzig et al. | 359/823 |
| 4,732,458 | 3/1988 | Zambelli | 359/823 |
| 4,919,519 | 4/1990 | Fantozzi et al. | 359/820 |
| 5,157,554 | 10/1992 | Kashihara | 359/820 |

Primary Examiner—Loha Ben
Assistant Examiner—Thomas Robbins
Attorney, Agent, or Firm—Hugh P. Gortler; M. W. Sales; W. K. Denson-Low

[57] ABSTRACT

An optical apparatus (2) has a first optical element (4, 4a) and a second optical element (5, 5a). The first optical element (4, 4a) is disposed in the same optical path (3) as the second optical element (5, 5a). A first optical assembly (6a, 6b, 8, 8a, 10, 10a, 20, 22, 24, 70, 72) is disposed between the first optical element (4, 4a) and the second optical element (5, 5a) along the optical path (3). The optical apparatus (2) has pneumatic adjusting means (40, 42) for pneumatically adjusting the position of the first optical assembly (6a, 6b, 8, 8a, 10, 10a, 20, 22, 24, 70, 72) along the optical path 3 such that the focal length of the optical apparatus (2) is changed.

18 Claims, 1 Drawing Sheet

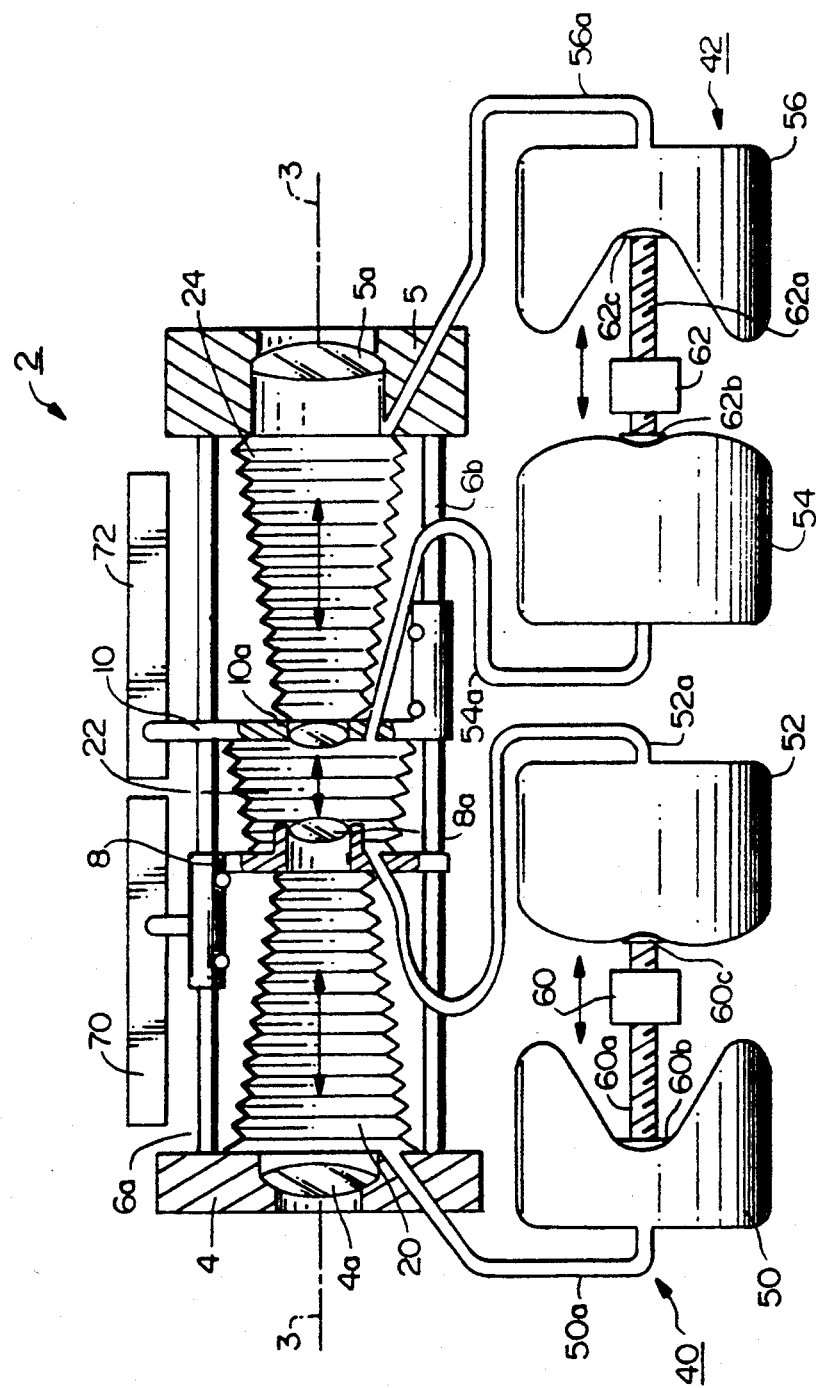

DIFFERENTIAL PNEUMATIC PRESSURE ZOOM LENS DRIVE

BACKGROUND OF THE INVENTION

The present invention relates to a zoom lens and, in particular, relates to one such zoom lens having a pressure differential pneumatic lens drive.

Conventional zoom lenses typically include an external drive mechanism which is attached to a moveable optical lens. In such a lens, since a driving force is acting at some distance from an optical axis the base length of guide bearings are made larger than would otherwise be necessary to control tilting of the lens. It is a disadvantage of such a lens that since driving components, such as motors, gears etc., are directly mounted on the lens assembly, the lens makes noise and cannot be made to operate "silent". Another disadvantage is that the lens still has some tilt and de-centering force acting thereon, which causes undesirable viewing error.

Consequently, it is highly desirable to provide a zoom lens that substantially overcomes the above-recited disadvantages of conventional zoom lenses.

SUMMARY OF THE INVENTION

Accordingly, it is one objective of the present invention to provide a zoom lens that avoids mounting motors on the lens. It is another objective to provide a zoom lens that can operate silently.

These objectives are accomplished, at least in part, by an optical apparatus having first and second optical elements disposed in the same optical path; and a first optical assembly, the first optical assembly being disposed between the first and second optical elements along the optical path. The optical apparatus also includes means for pneumatically adjusting the position of the optical assembly along the optical path such that the focal length of the optical apparatus is changed.

One important advantage of the invention is that the means for pneumatically adjusting is a "silent" drive system that produces an evenly distributed force acting directly on the optical components (i.e., mounted lenses) to be displaced or driven.

Another important advantage of the invention is that the drive or positioning forces are applied close to the optical axis of the lens, thereby minimizing or eliminating errors (tilt or de-center) encountered with conventional mechanically displaced drive systems described above.

Other objects and advantages of the present invention will become apparent to those skilled in the art from the following detailed description of the invention when read in conjunction with the appended claims and drawings attached hereto.

BRIEF DESCRIPTION OF THE DRAWING

The FIGURE, not drawn to scale, shows a side, cross-sectional view of a zoom lens embodying the principles of the present invention.

DETAILED DESCRIPTION OF THE INVENTION

As shown in the sole FIGURE, the invention features an optical apparatus 2 having a first optical element (4, 4a) and a second optical element (5, 5a). The first optical element (4, 4a) is disposed in the same optical path 3 as the second optical element (5, 5a). A first optical assembly (6a, 6b, 8, 8a, 10, 10a, 20, 22, 24, 70, 72) is disposed between the first optical elements (4, 4a) and the second optical element (5, 5a) along the optical path 3. The optical apparatus 2 also has means (40, 42), for pneumatically adjusting the position of the first optical assembly (6a, 6b, 8, 8a, 10, 10a, 20, 22, 24, 70, 72) along the optical path 3 such that the focal length of the optical apparatus 2 is changed.

In the preferred embodiment, the first optical element (4, 4a) has a stationary lens assembly (4) with a lens (4a). The second optical element (5, 5a) has a stationary lens assembly (5) with a lens (5a).

The first optical assembly (6a, 6b, 8, 8a, 10, 10a, 20, 22, 24, 70, 72) includes a first movable lens assembly (8, 8a, 70) with a lens (8a) and a second movable lens assembly (10, 10a, 72) with a lens (10a). The first movable lens assembly (8, 8a, 70) and the second movable lens assembly (10, 10a, 72) are slidably arranged on a first guide rod (6a) and a second guide rod (6b). Preferably, the first movable lens assembly (8, 8a, 70) has an optical glass scale and position feedback encoder 70, and the second movable lens assembly (10, 10a, 72) has an optical glass scale and position feedback encoder 72. The function of the first and second optical glass scales and position feedback encoders (70, 72) will be discussed in more detail below.

In the embodiment, the first optical assembly (6a, 6b, 8, 8a, 10, 10a, 20, 22, 24, 70, 72) also includes a first thin-walled metalized bellows (20), a second thin-walled metalized belows (22), and a third thin-walled metalized bellows (24). The first thin-walled metalized bellows (20) sealably couples the stationary first optical element (4, 4a) to the first movable lens assembly (8, 8a, 70). The second thin-walled metalized bellows (22) sealably couples the first movable lens assembly (8, 8a, 70) to the second movable lens assembly (10, 10a, 72). The third thin-walled metalized bellows (24) sealably couples the second movable lens assembly (10, 10a, 72) to the stationary second optical element (5, 5a).

The pneumatic adjusting means (40, 42) includes a first pneumatic adjusting means (40) and a second pneumatic adjusting means (42). The first pneumatic adjusting means (40) includes a first flexible diaphragm or variable volume precharged air chamber (50) and a second flexible diaphragm or variable volume precharged air chamber (52). The first flexible diaphragm (50) and the second flexible diaphragm (52) are mechanically coupled by a first mechanical actuator (60) having a first pressure applicator (60a) with a first member (60b) and a second member (60c) on each end. The first flexible diaphragm (50) is coupled to the first thin-walled metalized bellows (20) by a first conduit (50a). The second flexible diaphragm (52) is coupled to the second thin-walled metalized bellows (22) by a second conduit (52a).

The second pneumatic adjusting means (4.42) includes a third flexible diaphragm or variable volume precharged air chamber (54) and a fourth flexible diaphragm or variable volume precharged air chamber (56). The third flexible diaphragm (54) and the fourth flexible diaphragm (56) are coupled by a second mechanical actuator (62) with a second pressure applicator (62a) with a third member (62b) and a fourth member (62c) on each end thereof. The third flexible diaphragm (54) is coupled to the second thin-walled metalized bellows (22) by a third conduit (54a). The fourth flexible diaphragm (56) is coupled to the third thin-walled metalized bellows (24) by a fourth conduit (56a).

In operation, in order to slide the first movable lens assembly (8, 8a, 70) in one direction along the first and second guide rods (6a, 6b), the mechanical actuator 60 causes the first pressure applicator (60a) to push the first member (60b) into the first flexible diaphragm (50), compressing it. This compression increases the pressure of the precharged gas within the first thin-walled metalized bellows (20) via the first conduit (50a). As the first movable lens assembly (8, 8a, 70) slides in the one direction, the second thin-walled metalized bellows (22) is compressed and gas therein charges the second flexible diaphragm (52) via conduit (52a). Simultaneously, the mechanical actuator 60 causes the first pressure applicator (60a) to pull the second member (60c) away from the second flexible diaphragm (52), allowing it to maintain a lower pressure within the second thin-walled metalized bellows (22). As the air pressure increases in back of the first movable lens assembly (8, 8a, 70), the air pressure in the front is proportionally reduced causing the first movable lens assembly (8, 8a, 70) to move ahead until the air pressure equalizes in both the first and second thin-walled metalized bellows (20, 22).

In order to slide the first movable lens assembly (8, 8a, 70) in the other direction along the first and second guide rods (6a, 6b), the mechanical actuator 60 causes the first pressure applicator (60a) to push the second member (60c) into the second flexible diaphragm (52), compressing it. This compression increases the pressure within the second thin-walled metalized bellows (22) via the second conduit (52a). As the first movable lens assembly (8, 8a, 70) slides in the other direction, the first thin-walled metalized bellows (20) is compressed and gas charges the first flexible diaphragm (50) via the first conduit (50a). Simultaneously, the mechanical actuator 60 causes the first pressure applicator (60a) to pull the first member (60b) away from the first diaphragm (50), allowing it to maintain a lower pressure within the first thin-walled metalized bellows (20).

In operation, in order to slide the second movable lens assembly (10, 10a, 72) in one direction along the first and second guide rods (6a, 6b), the second mechanical actuator 62 causes the second pressure applicator (62a) to push the third member (62b) into the third flexible diaphragm (54), compressing it. This compression increases the pressure of the precharged gas within the second thin-walled metalized bellows (22) via the third conduit (54a). As the second movable lens assembly (10, 10a, 72) slides in the one direction, the third thin-walled metalized bellows (24) is compressed and gas charges the fourth flexible diaphragm (56) via the fourth conduit (56a). Simultaneously, the second mechanical actuator 62 causes the second pressure applicator (62a) to pull the fourth member (62c) away from the fourth flexible diaphragm (56), allowing it to maintain a lower pressure within the third thin-walled bellows (24).

In order to slide the second movable lens assembly (10, 10a, 72) in the other direction along the first and second guide rods (6a, 6b), the second mechanical actuator 62 causes the second pressure applicator (62a) to push the fourth member (62c) into the fourth flexible diaphragm (56), compressing it. This compression increases the pressure within the third thin-walled metalized bellows (24) via the fourth conduit (56a). As the second movable lens assembly (10, 10a, 72) slides in the other direction, the second thin-walled metalized bellows (22) is compressed and gas charges the third flexible diaphragm (54) via the third conduit (54a). Simultaneously, the second mechanical actuator 62 causes the second pressure applicator (62a) to pull the third member (62b) away from the third diaphragm (54), allowing it to maintain a lower pressure within the second thin-walled bellows (22).

In a preferred embodiment, the mechanical actuators (60, 62) are servo motors for producing mechanical differential pressure driven in a "stepper" mode to avoid possible "hunting" due to compressibility of the gas, the mass of components etc. The precharged variable volume chambers (50, 52, 54, 56) can be part of the lens assemblies or, if a "silent" lens is desirable, be remotely mounted to avoid the actuator noise.

In the preferred embodiment, the flexible diaphragms (50, 52, 54, 56) and the bellows (20, 22, 24) are pre-pressurized with dry nitrogen gas charged to 2–3 atmospheres. As used herein, the term "pneumatic" is intended to include any gas, including air.

In the preferred embodiment, the optical apparatus 2 is a zoom lens assembly 2.

The zoom lens changes its focal length by moving the first and second movable lens assemblies (8, 8a, 70) and (10, 10a, 72) along the guide rails in either direction. For the sake of simplicity, the drawing refers to a fixed focus (focused on infinity) zoom lens. As the focal length is changed in the zoom lens by moving the first zooming group (typically a large distant movement), the second zoom group is simultaneously moved in a lesser distance in order to keep the image plane on the same spot.

In a preferred embodiment, the positions of the movable lens assemblies are monitored by the optical glass scale (70, 72) or other encoding device for providing a feedback signal to the driving servo motor (60, 62). Moving along the first and second guide rods (6a, 6b) are a pair of position feedback encoders (70, 72) mounted on the movable lens assemblies first and second respectively. The incremental position sensor (glass scale assembly) generates the up-down pulses for the position counter, this counter is read and compared with a set of values (stored in the memory as positional data) and the difference actuates the servo loop. The electro mechanical actuators (D.C. motors) are driven by this system and are part of the servo loop.

The invention has applications for zoom lens, and may also be applied to any optical instrument where components have to be displaced and maintained in positions.

Although the present invention has been described herein with respect to one or more embodiments, it will be understood that other arrangements and configurations can be made by those skilled in the art without departing from the spirit and scope of the invention. Hence, the present invention is deemed limited only by the following claims and the reasonable interpretation thereof.

What is claimed is:

1. An optical apparatus, comprising:
   a first optical element;
   a second optical element, said first and second optical elements being disposed along an optical path;
   a third optical element positioned between said first and second optical elements along said optical path; and
   adjusting means for pneumatically adjusting the position of said third optical element along said optical path, said adjusting means creating a pressure differential across said third optical element when the position of said third optical element is to be adjusted.

2. An optical apparatus according to claim 1, wherein the first optical element includes a stationary lens, and the second optical element includes a stationary lens.

3. An optical apparatus according to claim 1, further comprising a fourth optical element positioned between said second and third optical elements, wherein the position of the fourth optical element is also adjusted by said adjusting means.

4. An optical apparatus according to claim 3, further including optical glass scale position feedback encoders for providing position feedback encoder information to the adjusting means.

5. An optical apparatus according to claim 3, wherein the adjusting means includes a first thin-walled metalized bellows, a second thin-walled metalized bellows, and a third thin-walled metalized bellows, and wherein the first thin-walled metalized bellows sealably couples the first optical element to the third optical element, the second thin-walled metalized bellows sealably couples the third optical element to the fourth optical element, and the third thin-walled metalized bellows sealably couples the fourth optical element to the second optical element.

6. An optical apparatus according to claim 5 wherein the adjusting means includes first and second flexible diaphragms for creating a pressure differential across said third optical element, and a third and fourth flexible diaphragm for creating a pressure differential across said fourth optical element.

7. An optical apparatus according to claim 6, wherein the first and second diaphragms are coupled by a first mechanical actuator with a first pressure applicator, and wherein the third flexible diaphragm and the fourth flexible diaphragm are coupled by a second mechanical actuator with a second pressure applicator.

8. An optical apparatus according to claim 7, wherein the first flexible diaphragm is coupled to the first bellows by a second conduit, the second and third flexible diaphragms are coupled to the second thin-walled metalized bellows by a third conduit, and the fourth flexible diaphragm is coupled to the third thin-walled metalized bellows by a fourth conduit.

9. An optical apparatus according to claim 1, wherein the adjusting means includes a first flexible diaphragm and a second flexible diaphragm for creating a pressure differential across said third optical element.

10. An optical apparatus according to claim 9, wherein the first flexible diaphragm and the second flexible diaphragm are mechanically coupled by a first mechanical actuator having a first pressure applicator.

11. An optical apparatus according to claim 10, wherein the first flexible diaphragm is coupled to a first thin-walled metalized bellows by a first conduit, and a second flexible diaphragm is coupled to the second thin-walled metalized bellows by a second conduit, the first bellows being secured between the first and third optical elements, the second bellows being secured between the second and third elements.

12. A optical apparatus according to claim 1, wherein the optical apparatus is a zoom lens.

13. An optical apparatus according to claim 1, wherein the adjusting means uses nitrogen as a pneumatic gas for creating the pressure differential across the third optical element.

14. An optical apparatus, comprising:
first and second optical elements defining an optical path;
third and fourth optical elements positioned along the optical path between the first and second optical elements;
a first bellows sealably coupling the first optical element to the third optical element;
a second bellows sealably coupling the third optical element to the fourth optical element;
a third bellows sealably coupling the fourth first optical element to the second optical element; and
pressurizing means for pressurizing the first bellows when the position of the third optical element is to be adjusted relative to the first optical element and for pressurizing the third bellows when the position of the fourth optical element is to be adjusted relative to the second optical element.

15. The apparatus of claim 14, wherein the adjusting means includes first and second flexible diaphragms for pressurizing the first bellows, and third and fourth flexible diaphragms for pressurizing the third bellows.

16. The apparatus of claim 15, wherein the first and second diaphragms are coupled together by a first mechanical actuator with a first pressure applicator, and wherein the third and fourth flexible diaphragms are coupled together by a second mechanical actuator with a second pressure applicator.

17. The apparatus of claim 15, wherein the first flexible diaphragm is coupled to the first bellows by a second conduit, the second and third flexible diaphragms are coupled to the second thin-walled metalized bellows by a third conduit, and the fourth flexible diaphragm is coupled to the third thin-walled metalized bellows by a fourth conduit.

18. The apparatus of claim 14, wherein the adjusting means uses nitrogen as a pneumatic gas for pressurizing the first and third bellows.

* * * * *